US007143306B2

(12) United States Patent
Porat et al.

(10) Patent No.: US 7,143,306 B2
(45) Date of Patent: Nov. 28, 2006

(54) DATA STORAGE SYSTEM

(75) Inventors: Ofer Porat, Westborough, MA (US); Brian K. Campbell, Milford, MA (US); Jane Xu, Franklin, MA (US); Eric J. Bruno, Marlborough, MA (US); Paul C. Wilson, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 486 days.

(21) Appl. No.: 10/403,262

(22) Filed: Mar. 31, 2003

(65) Prior Publication Data

US 2004/0193973 A1     Sep. 30, 2004

(51) Int. Cl.
*G06F 11/00* (2006.01)
(52) U.S. Cl. .............................. 714/5; 710/37; 710/38
(58) Field of Classification Search ................... 714/5
See application file for complete search history.

(56) References Cited

U.S. PATENT DOCUMENTS

| | | | | |
|---|---|---|---|---|
| 5,206,939 | A | | 4/1993 | Yanai et al. ............... 395/400 |
| 5,214,768 | A | * | 5/1993 | Martin et al. .............. 711/114 |
| 5,781,717 | A | * | 7/1998 | Wu et al. .................... 714/8 |
| 5,819,054 | A | * | 10/1998 | Ninomiya et al. ............ 712/3 |
| 5,978,889 | A | * | 11/1999 | Zigras ........................ 711/149 |
| 6,195,770 | B1 | * | 2/2001 | Walton ........................ 714/53 |
| 6,260,079 | B1 | * | 7/2001 | White .......................... 710/8 |
| 6,301,637 | B1 | | 10/2001 | Krull et al. ................. 711/112 |
| 6,389,494 | B1 | | 5/2002 | Walton et al. ............... 710/126 |
| 6,467,047 | B1 | * | 10/2002 | Scaringella et al. ............ 714/6 |
| 6,567,890 | B1 | * | 5/2003 | Mulvey et al. ............. 711/114 |
| 6,571,355 | B1 | * | 5/2003 | Linnell ......................... 714/9 |
| 6,609,164 | B1 | * | 8/2003 | Kallat ......................... 710/22 |
| 6,615,315 | B1 | * | 9/2003 | Mulvey et al. ............. 711/114 |
| 6,636,933 | B1 | * | 10/2003 | MacLellan et al. ......... 710/317 |
| 6,772,230 | B1 | * | 8/2004 | Chen et al. .................... 710/8 |
| 6,779,071 | B1 | * | 8/2004 | Kallat et al. ................ 710/317 |
| 6,907,483 | B1 | * | 6/2005 | Castel et al. ................. 710/74 |
| 2002/0133735 | A1 | * | 9/2002 | McKean et al. ............... 714/5 |
| 2003/0036363 | A1 | * | 2/2003 | Jones et al. ................... 455/90 |
| 2003/0051124 | A1 | * | 3/2003 | Dowling ..................... 712/244 |
| 2004/0133750 | A1 | * | 7/2004 | Stewart et al. .............. 711/148 |

\* cited by examiner

*Primary Examiner*—Scott Baderman
*Assistant Examiner*—Loan Truong

(57) ABSTRACT

A system interface having a cache memory and a plurality of directors. Each one of the plurality of directors includes a data pipe coupled between an input of such one of the directors. The data pipe includes a data pipe memory and a data pipe memory controller for controlling the data pipe memory. Each one of the directors includes microprocessor coupled to the data pipe memory controller. The system includes a switching network coupled to the cache memory to transfer data between the memory and: (a) the input of a selected one of the plurality of directors through the data pipe memory; (b) the microprocessor and the data pipe memory through the data pipe memory controller of a selected one of the plurality of directors; and (c) the microprocessor and the data pipe memory controller while bypassing the data pipe memory of a selected one of the plurality of directors.

12 Claims, 9 Drawing Sheets

| FIG. 6A |
| FIG. 6B |
| FIG. 6C |
| FIG. 6D |

DATA STORAGE SYSTEM

INCORPORATION BY REFERENCE

This application incorporates by reference, in their entirety, the following co-pending patent applications all assigned to the same assignee as the present invention:

| INVENTORS | FILING DATE | SERIAL NO. | TITLE |
|---|---|---|---|
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed Dec. 30, 1998) |
| Christopher S. MacLellan et al. | Dec. 21, 2000 | 09/745,859 | Data Storage System Having Plural Fault Domains |
| John K. Walton | May 17, 2001 | 09/859,659 | Data Storage System Having No-Operation Command |
| Daniel Castel | Mar. 28, 2002 | 10/109,583 | Data Storage System |

TECHNICAL FIELD

This invention relates generally to data storage systems, and more particularly to data storage systems having redundancy arrangements to protect against total system failure in the event of a failure in a component or subassembly of the storage system.

BACKGROUND

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

SUMMARY OF THE INVENTION

In accordance with the present invention, a system interface is provided having a cache memory and a plurality of directors. Each one of the plurality of directors includes a data pipe coupled to an input of such one of the directors. The data pipe includes a data pipe memory and a data pipe memory controller for controlling the data pipe memory. Each one of the directors includes microprocessor coupled to the data pipe memory controller. The system includes a switching network coupled to the cache memory to transfer data between the memory and: (a) the input of a selected one of the plurality of directors through the data pipe memory; (b) the microprocessor and the data pipe memory through the data pipe memory controller of a selected one of the plurality of directors; and (c) the microprocessor and the data pipe memory controller while by-passing the data pipe memory of a selected one of the plurality of directors.

In one embodiment, the switching network includes: (1) a plurality of first ports, each one of such first ports being coupled to a corresponding one of a first one of the pair of ports of the data pipe memory; (2) a plurality of second ports, each one being coupled to a corresponding one of a second one of the pair of ports of the data pipe memory; (3) a plurality of third ports each one being coupled to a corresponding one of a first one of a pair of ports of the data pipe memory controller; (4) a plurality of fourth ports, each one being coupled to a corresponding one of a second one of the pair of ports of the data pipe memory controller.

In one embodiment, the switching network is coupled to the cache memory to transfer data between the memory and: (a) the input of the selected one of the plurality of directors through the data pipe memory through the first or second ports of the switch network; (b) the microprocessor and the data pipe memory through the data pipe memory controller through the first or second ports of the switch network; and (c) the microprocessor and the data pipe memory controller while by-passing the data pipe memory through the third or fourth ports of the switch network.

In one embodiment, the switch network includes a pair of switches, one of such switches being coupled to a first portion of the cache memory and another one of the switches being coupled to a second portion of the cache memory, wherein the first one of the pair of switches has the first ports and the third ports and wherein the second one of the switches has the second ports and the fourth ports.

In one embodiment, the data pipe memory is a quad port RAM.

In one embodiment, each one of the pair of switches includes a plurality of switch sections, each one being coupled a corresponding one of the first ports and a corresponding one of the third ports. Each one of the switch sections comprises: a buffer coupled to said corresponding one of the third ports for storing a plurality of successive commands on the corresponding one of the third ports; a status section for providing a done signal indicating when a command is successfully transferred to the memory; and a controller coupled to the buffer and the status section for enabling a succeeding one of the plurality of stored commands in the buffer to be transferred to the memory in response to the done signal.

The details of one or more embodiments of the invention are set forth in the accompanying drawings and the description below. Other features, objects, and advantages of the invention will be apparent from the description and drawings, and from the claims.

DESCRIPTION OF DRAWINGS

These and other features of the invention will become more readily apparent from the following detailed description when read together with the accompanying drawings, in which.

DETAILED DESCRIPTION

Figure 1:
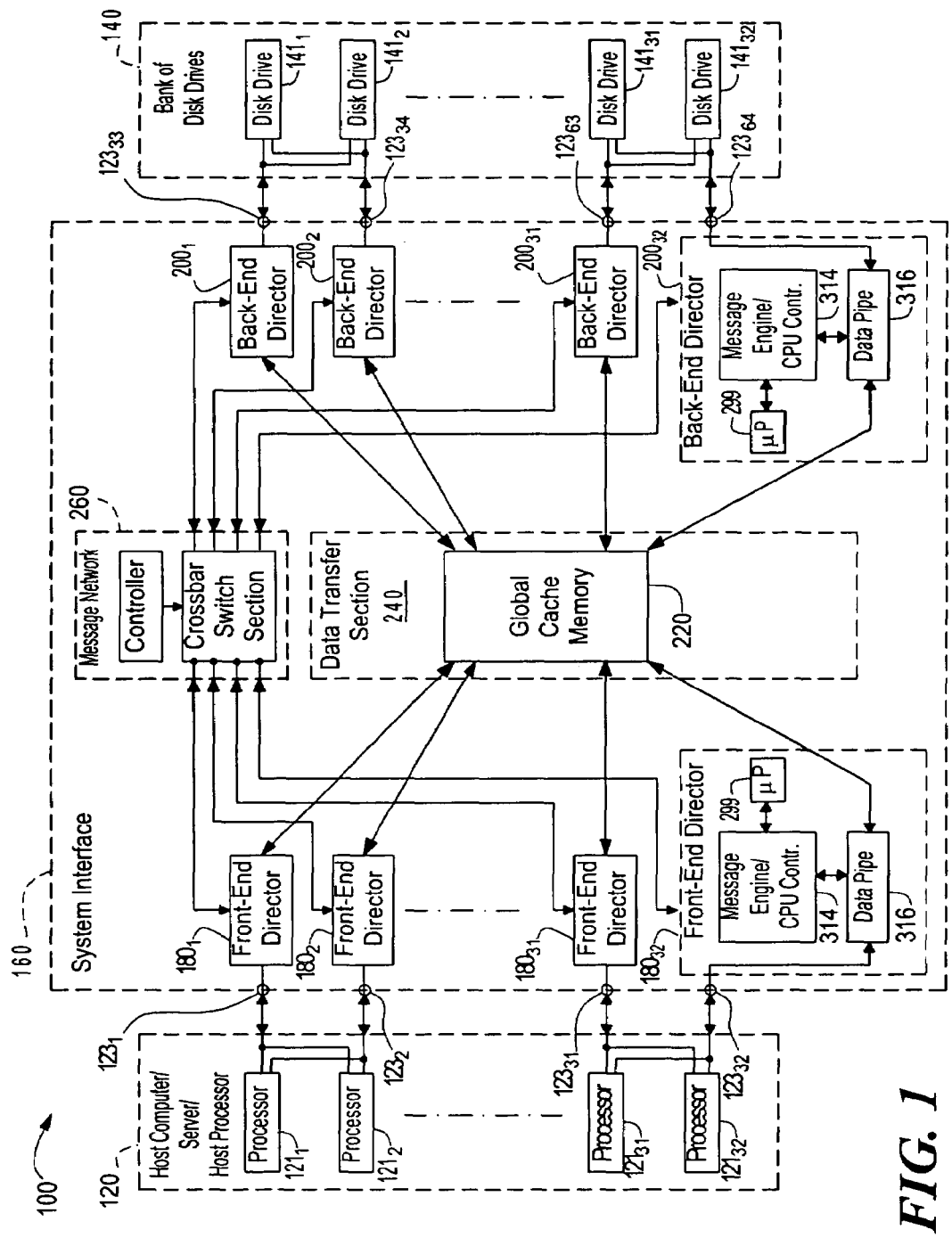
FIG. 1 is a block diagram of a data storage system according to the invention.

Referring now to FIG. 1 a data storage system 100 is shown for transferring data between a host computer/server 120 and a bank of disk drives 140 through a system interface 160. The system interface 160 includes: a plurality of, here 32 front-end directors 180$_1$–180$_{32}$ coupled to the host computer/server 120 via ports 123$_1$–123$_{32}$; a plurality of back-end directors 200$_1$–200$_{32}$ coupled to the bank of disk drives 140 via ports 123$_{33}$–123$_{64}$; a data transfer section 240, having a global cache memory 220, coupled to the plurality of front-end directors 180$_1$–180$_{16}$ and the back-end directors 200$_1$–200$_{16}$; and a messaging network 260, operative independently of the data transfer section 240, coupled to the plurality of front-end directors 180$_1$–180$_{32}$ and the plurality of back-end directors 200$_1$–200$_{32}$, as shown. The front-end and back-end directors 180$_1$–180$_{32}$, 200$_1$–200$_{32}$ are functionally similar and include a microprocessor (µP) 299 (i.e., a central processing unit (CPU) and RAM), a message engine/CPU controller 314 and a data pipe 316.

The front-end and back-end directors 180$_1$–180$_{32}$, 200$_1$–200$_{32}$ control data transfer between the host computer/server 120 and the bank of disk drives 140 in response to messages passing between the directors 180$_1$–180$_{32}$, 200$_1$–200$_{32}$ through the messaging network 260. The messages facilitate the data transfer between host computer/server 120 and the bank of disk drives 140 with such data passing through the global cache memory 220 via the data transfer section 240. More particularly, in the case of the front-end directors 180$_1$–180$_{32}$, the data passes between the host computer to the global cache memory 220 through the data pipe 316 in the front-end directors 180$_1$–180$_{32}$ and the messages pass through the message engine/CPU controller 314 in such front-end directors 180$_1$–180$_{32}$. In the case of the back-end directors 200$_1$–200$_{32}$ the data passes between the back-end directors 200$_1$–200$_{32}$ and the bank of disk drives 140 and the global cache memory 220 through the data pipe 316 in the back-end directors 200$_1$–200$_{32}$ and again the messages pass through the message engine/CPU controller 314 in such back-end director 200$_1$–200$_{32}$.

With such an arrangement, the cache memory 220 in the data transfer section 240 is not burdened with the task of transferring the director messaging. Rather the messaging network 260 operates independent of the data transfer section 240 thereby increasing the operating bandwidth of the system interface 160.

Figure 2:
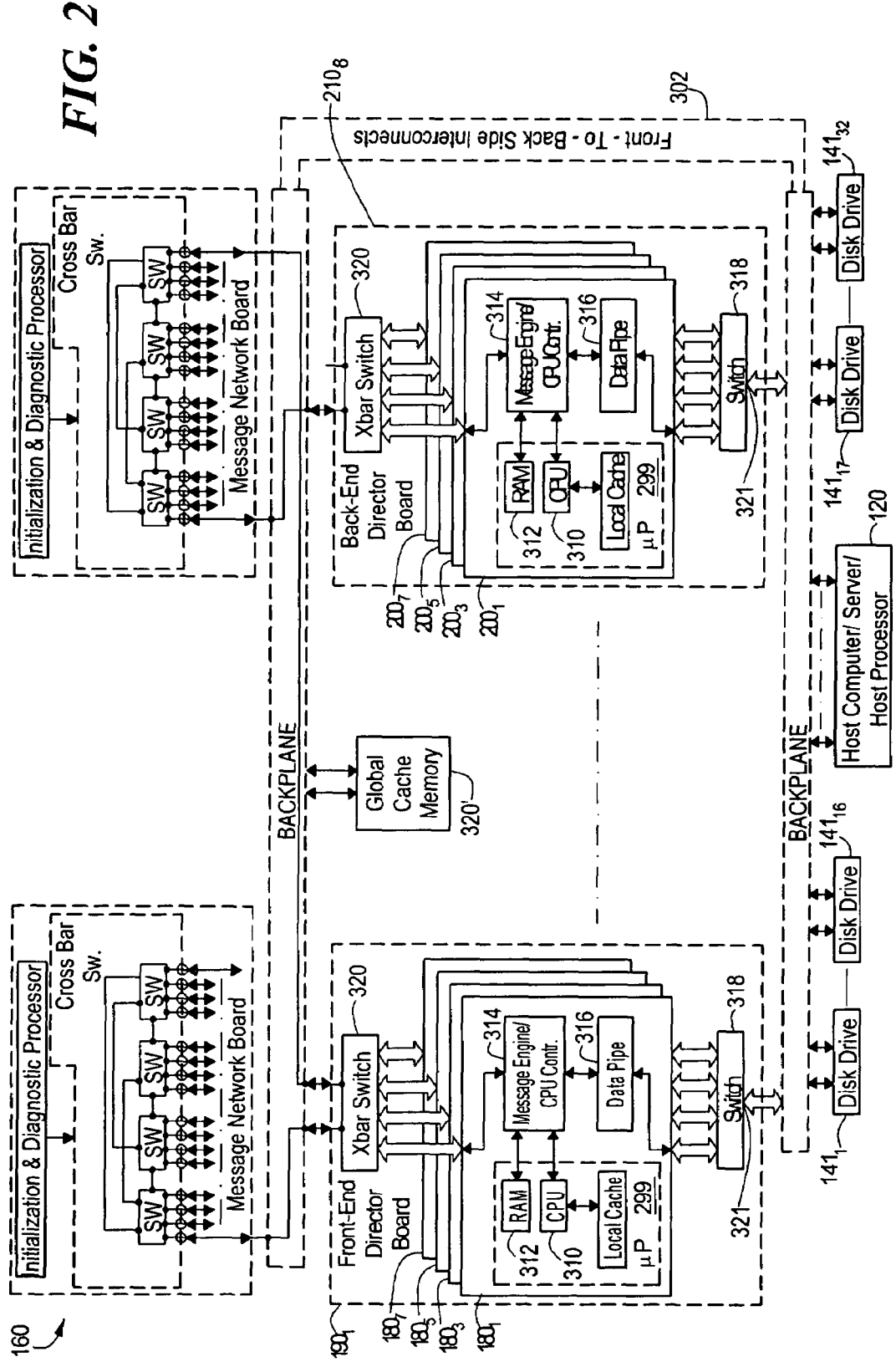
FIG. 2 is a block diagram of the system interface used in the data storage system of FIG. 1.
Figure 3:
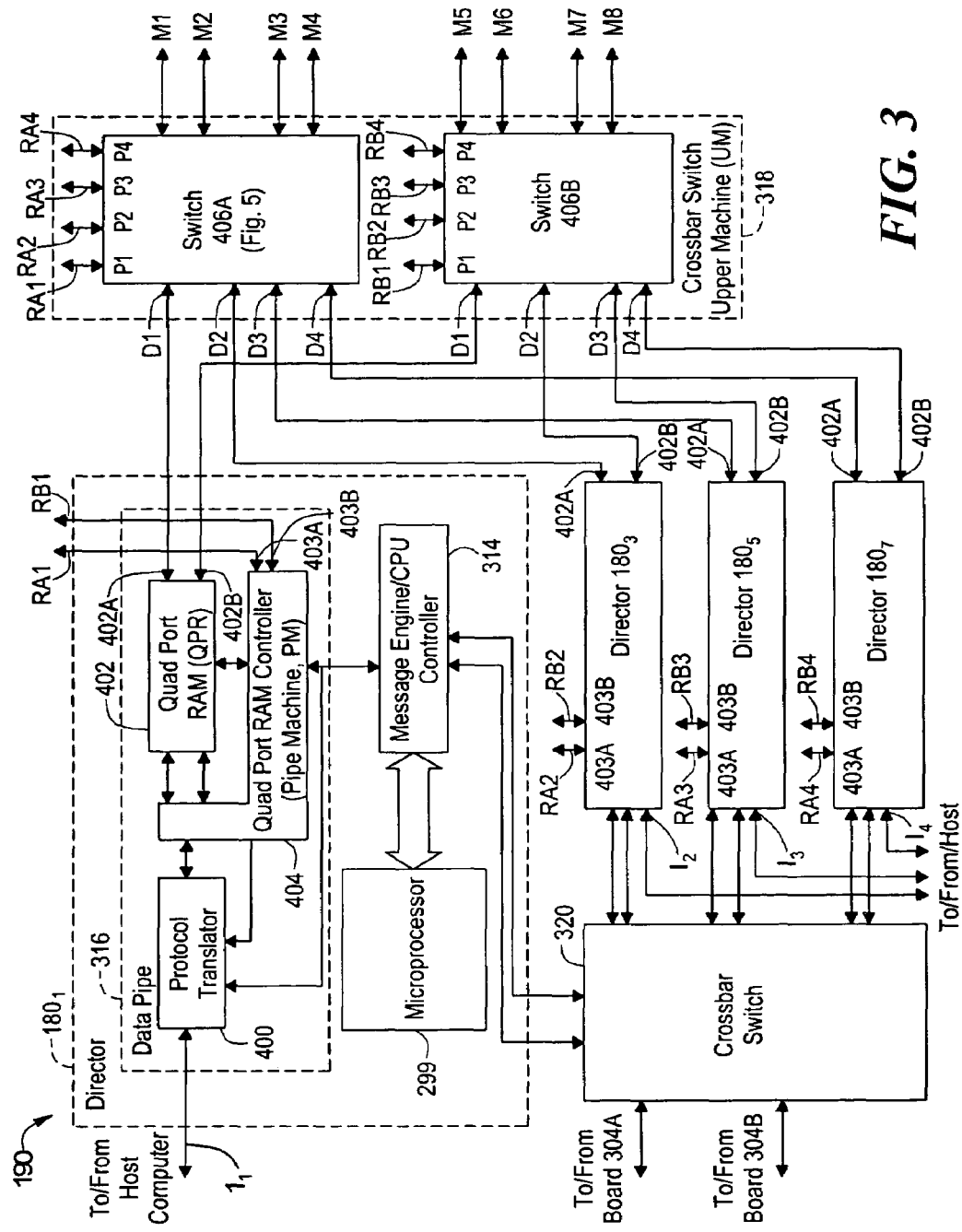
FIG. 3 is a block diagram of an exemplary one of a plurality of director boards used in the interface of FIG. 2.

Referring now to FIGS. 2 and 3, each one of the director boards 190$_1$–210$_8$ includes, as noted above four of the directors 180$_1$–180$_{32}$, 200$_1$–200$_{32}$ (FIG. 2). It is noted that the director boards 190$_1$–190$_8$ having four front-end directors per board, 180$_1$–180$_{32}$ are referred to as front-end directors and the director boards 210$_1$–210$_8$ having four back-end directors per board, 200$_1$–200$_{32}$ are referred to as back-end directors. Each one of the directors 180$_1$–180$_{32}$, 200$_1$–200$_{32}$ includes the microprocessor 299 referred to above, the message engine/CPU controller 314, and the data pipe 316 shown in FIG. 1.

The front-end director boards have ports 123$_1$–123$_{32}$, as shown in FIG. 1 coupled to the processors 121$_1$–121$_{32}$, as shown. The back-end director boards have ports 123$_{33}$–123$_{64}$, as shown in FIG. 2, coupled to the disk drives 141$_1$–141$_{32}$, as shown.

Each one of the director boards 190$_1$–210$_8$ includes a crossbar switch 318 as shown in FIG. 3 for an exemplary one of the director boards 190$_1$–210$_8$, here director board 190$_1$. The crossbar switch 318 has four input/output ports, each one being coupled to the data pipe 316 (FIG. 2) of a corresponding one of the four directors 180$_1$–180$_{32}$, 200$_1$–200$_{32}$ on the director board 190$_1$–210$_8$. The crossbar switch 318 has eight output/input ports collectively identified in FIG. 3 by numerical designation 321 (which plug into the backplane 302). The crossbar switch 318 on the front-end director boards 191$_1$–191$_8$ is used for coupling the data pipe 316 of a selected one of the four front-end directors 180$_1$–180$_{32}$ on the front-end director board 190$_1$–190$_8$ to the global cache memory 220 via the backplane 302 and I/O adapter, not shown. The crossbar switch 318 on the back-end director boards 210$_1$–210$_8$ is used for coupling the data pipe 316 of a selected one of the four back-end directors 200$_1$–200$_{32}$ on the back-end director board 210$_1$–210$_8$ to the global cache memory 220 via the backplane 302 and I/O adapter, not shown.

Thus, referring to FIGS. 1 and 2, the data pipe 316 in the front-end directors 180$_1$–180$_{32}$ couples data between the host computer 120 and the global cache memory 220 while the data pipe 316 in the back-end directors 200$_1$–200$_{32}$ couples data between the bank of disk drives 140 and the global cache memory 220. It is noted that there are separate point-to-point data paths PTH1–PTH64 (FIG. 1) between each one of the directors 180$_1$–180$_{32}$, 200$_1$–200$_{32}$ and the global cache memory 220.

Further, as described in the co-pending patent applications referred to above, crossbar switch 320 (FIG. 2) plugs into the backplane 302 and is used for coupling to the directors to the message network 260 (FIG. 2) through the backplane.

Referring now to FIG. 3, an exemplary one of the director boards $1901_1$–$1908_1$, $2101_1$–$2108_1$, here director board $1901_1$ is shown to include directors $1801$, $1803$, $1805$ and $1807$. An exemplary one of the directors $1801$–$1804$, here director $1801$ is shown in detail to include the data pipe $316$, the message engine/CPU controller $314$, and the microprocessor $299$, arranged as shown.

The data pipe $316$ includes a protocol translator $400$, a data pipe memory, here a quad port RAM (QPR) $402$ and a data pipe memory controller, here a quad port RAM controller (herein also referred to as a pipe machine, PM) $404$ arranged as shown. Briefly, the protocol translator $400$ converts between the protocol of the host computer $120$, in the case of a front-end director $1801_1$–$1803_2$, (and between the protocol used by the disk drives in bank $140$ in the case of a back-end director $2001_1$–$2003_2$) and the protocol between the directors $1801$–$1803$, $2001$–$2003_2$ and the global memory $220$ (FIG. 1). More particularly, the protocol used the host computer $120$ may, for example, be fibre channel, SCSI, ESCON or FICON, for example, as determined by the manufacture of the host computer $120$ while the protocol used internal to the system interface $160$ (FIG. 2) may be selected by the manufacturer of the interface $160$. The quad port RAM $402$ is a FIFO controlled by controller $404$ because the rate data coming into the RAM $402$ may be different from the rate data leaving the RAM $402$. The RAM $402$ has four ports. Here, the protocol translator $400$ produces digital words for the system interface $160$ (FIG. 1) protocol, one portion of the word is coupled to one of a pair of the ports of the quad port RAM $402$ and the other portion of the word is coupled to the other one of the pair of the ports of the quad port RAM $402$.

The quad port RAM $402$ has a pair of ports $402$A, $402$B, each one of two ports $402$A, $402$B. Data is transferred between the ports $402$A, $402$B and the cache memory $220$ (FIG. 1) through the crossbar switch (herein also referred to as the upper machine, UM) $318$, as shown.

The crossbar switch $318$ includes the pair of switches $406$A, $406$B. Each one of the switches $406$A, $406$B includes four QPR ports D1–D4; four pipe machine (PM) ports P1–P4 and four input/output memory-side ports M1–M4, M5–M8, respectively, as indicated. The input/output memory-side ports M1–M4, M5–M8 are collectively shown in connection with FIG. 2 as port $321$).

Referring to FIG. 3. the ports D1–D4 of switch $406$A are connected to the $402$A ports of a corresponding one of the quad port RAMs $402$ in each one the directors $1801$, $1803$, $1805$ and $1807$, respectively, as indicated. Likewise, QPR ports D1–D4 of switch $406$B are connected to the $402$B ports of the quad port RAMs $402$ of a corresponding one of the directors $1801$, $1803$, $1805$, and $1807$, respectively, as indicated. The PM ports P1–P4 of switch $406$A are connected to the one of the pair of ports $403$A, $402$A ports, here ports $403$A of a corresponding one of the quad port RAM controllers $404$ in each one the directors $1801$, $1803$, $1805$ and $1807$, respectively, as indicated though busses RA1–RA4, respectively, as shown. Likewise, the PM ports PIP4 of switch $406$B are connected to the $403$B ports of the quad port RAM controller $404$ of a corresponding one of the directors $1801$, $1803$, $1805$, and $1807$, respectively, as indicated, through busses RB1–RB4, respectively, as shown.

The ports D1–D4 are selectively coupled to the ports M1–M4 in accordance with control words provided to the switch $406$A by the controllers $404$ in directors $1801$, $1803$, $1805$, $1807$ on busses RA1–RA4, respectively, and the ports D1–D4 are coupled to ports M5–M8 in accordance with the control words provided to switch $406$B by the controllers $404$ in directors $1801$, $1803$, $1805$, $1807$ on busses RB1–RB4, as indicated.

The signals RA1–RA4, are coupled to PM ports P1–P4, respectively, of switch $406$A and the buses RB1–RB4, are coupled to PM ports P1–P4, respectively, of switch $406$B. The signals on buses RA1–RA4 include request signals and also enable data transfer between the memory ports M1–M8 through the pipe machine $404$ and the microprocessor $299$. Thus, for example, the signal on bus RA1 from the PM $404$ of director $180_1$ may be used to request data transfer between one of the memories $M_1$–$M_4$ through the QPR $402$ and the host computer through switch $406$A. The bus RA1 may also be used to transfer data between one of the memories $M_1$–$M_4$ and the microprocessor $299$ in director $180_1$.

Likewise, the signal on bus RB1 from the PM $404$ of director $180_1$, may be used to request data transfer between one of the memories $M_5$–$M_8$ through the QPR $402$ and the host computer through switch $406$B. The bus RB1 may also be used to transfer data between one of the memories $M_5$–$M_8$ and the microprocessor $299$ in director $180_1$.

The other directors $180_1$, $180_3$, $180_5$ and $180_7$ operate in a similar manner with respect to busses RA2, RB2; RA3, RB3; and RA4, RB4, respectively.

Figure 4:
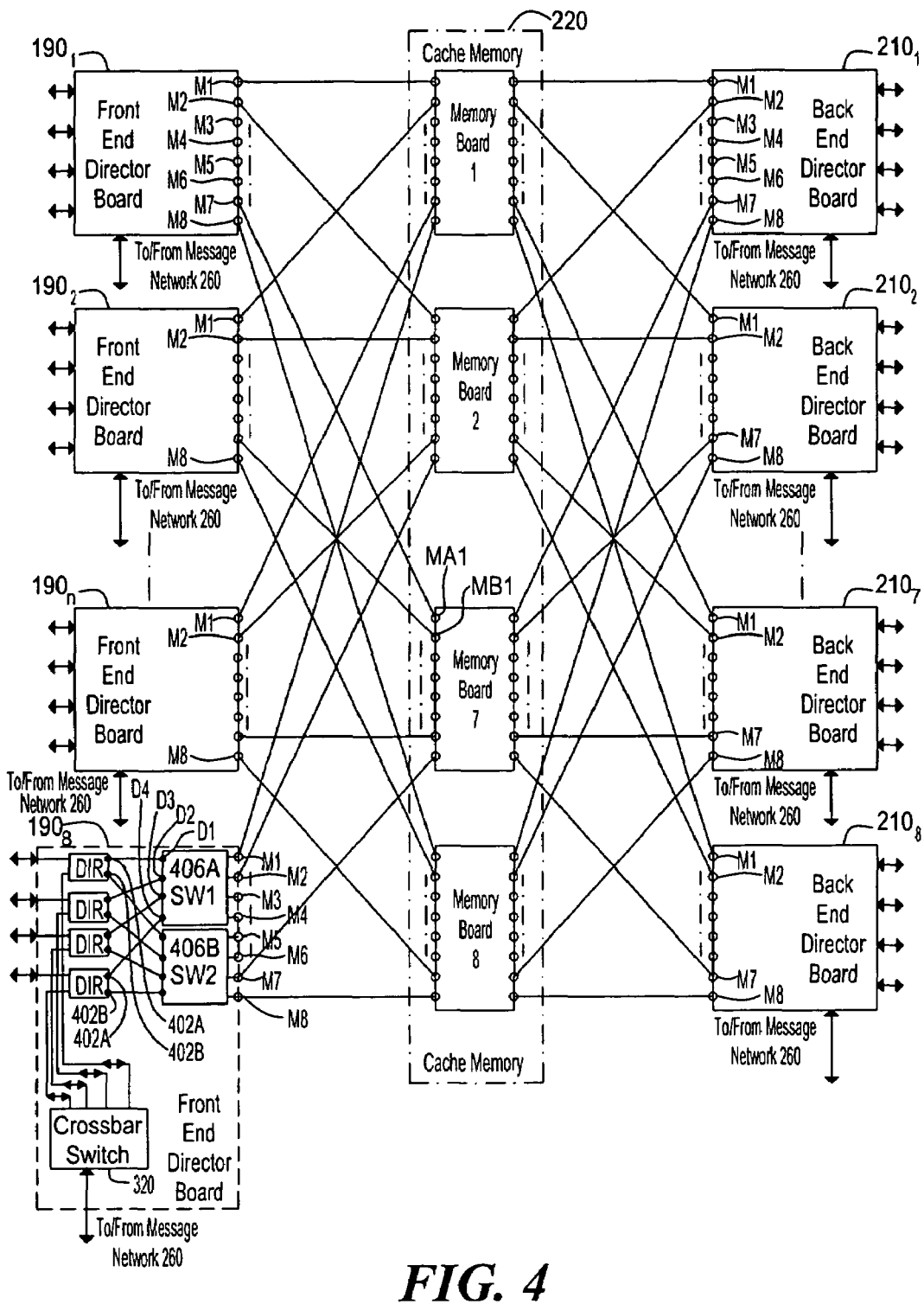
FIG. 4 is a diagram of the interface of FIG. 3 having a plurality of the director boards of FIG. 3 interconnected to a global cache memory.

Considering the request signals on the busses $R_{A1}$–$R_{A4}$ for exemplary switch $406$A, of any one of the directors $180_1$, $180_3$, $180_5$, $180_7$ may be coupled to any one of the ports $M_1$–$M_4$ of switch $406$A, selectively in accordance with the request signals on buses $R_{A1}$–$R_{A4}$. Likewise, port $402$B of any one of the directors $180_1$–$180_4$ may be coupled to any one of the ports $M_5$–$M_8$ of switch $406$B, selectively in accordance with the request signals on buses $R_{B1}$–$R_{B4}$. The coupling between the director boards $190_1$–$190_8$, $210_1$–$210_8$ and the global cache memory $220$ is shown in FIG. 4.

Referring again to FIG. 3, as noted above, the crossbar switch $318$ includes a pair of crossbar switches $406$A, $406$B. Each one of the switches $406$A, $406$B includes four input/output director-side, or QPR ports $D_1$–$D_4$ and the four input/output memory-side ports collectively designated in FIG. 2 by numerical designation $321$. The QPR ports $D_1$–$D_4$ of switch $406$A are connected to the four directors on the director board, as indicated. Likewise, QPR ports $D_1$–$D_4$ of switch $406$B are also connected to the dual-ported directors on such board, $_{as}$ indicated. Thus, as described in the co-pending patent applications referred to above, each director is a dual-ported director.

More particularly, and referring also to FIG. 1, as noted above, each one of the host computer processors $121_1$–$121_{32}$ in the host computer $120$ is coupled to a pair of the front-end directors $180_1$–$180_{32}$, to provide redundancy in the event of a failure in one of the front end-directors $181_1$–$181_{32}$ coupled thereto as described in the above-referenced patent applications.

Referring again to FIG. 3, the switching network $318$ is coupled to the cache memory $220$ (FIG. 1) to transfer data between the memory $220$ and: (a) the input I of a selected one of the plurality of directors $180_1$, $180_3$, $180_5$, $180_7$ through the quad port RAM $402$, (i.e., an I/O transfer); (b) the microprocessor $299$ and the data pipe memory through the quad port RAM controller $404$ of a selected one of the plurality of directors $180_1$, $180_3$, $180_5$, $180_7$, (i.e., a DMA transfer adapted to transfer words into or from the cache memory $220$); and (c) the microprocessor $299$ and the quad port RAM controller $404$ while by-passing the quad port RAM $402$ of a selected one of the plurality of directors $180_1$, $180_3$, $180_5$, $180_7$ (i.e. a DSA transfer adapted to transfer words to or from the cache memory $220$).

Figures 5, 6:
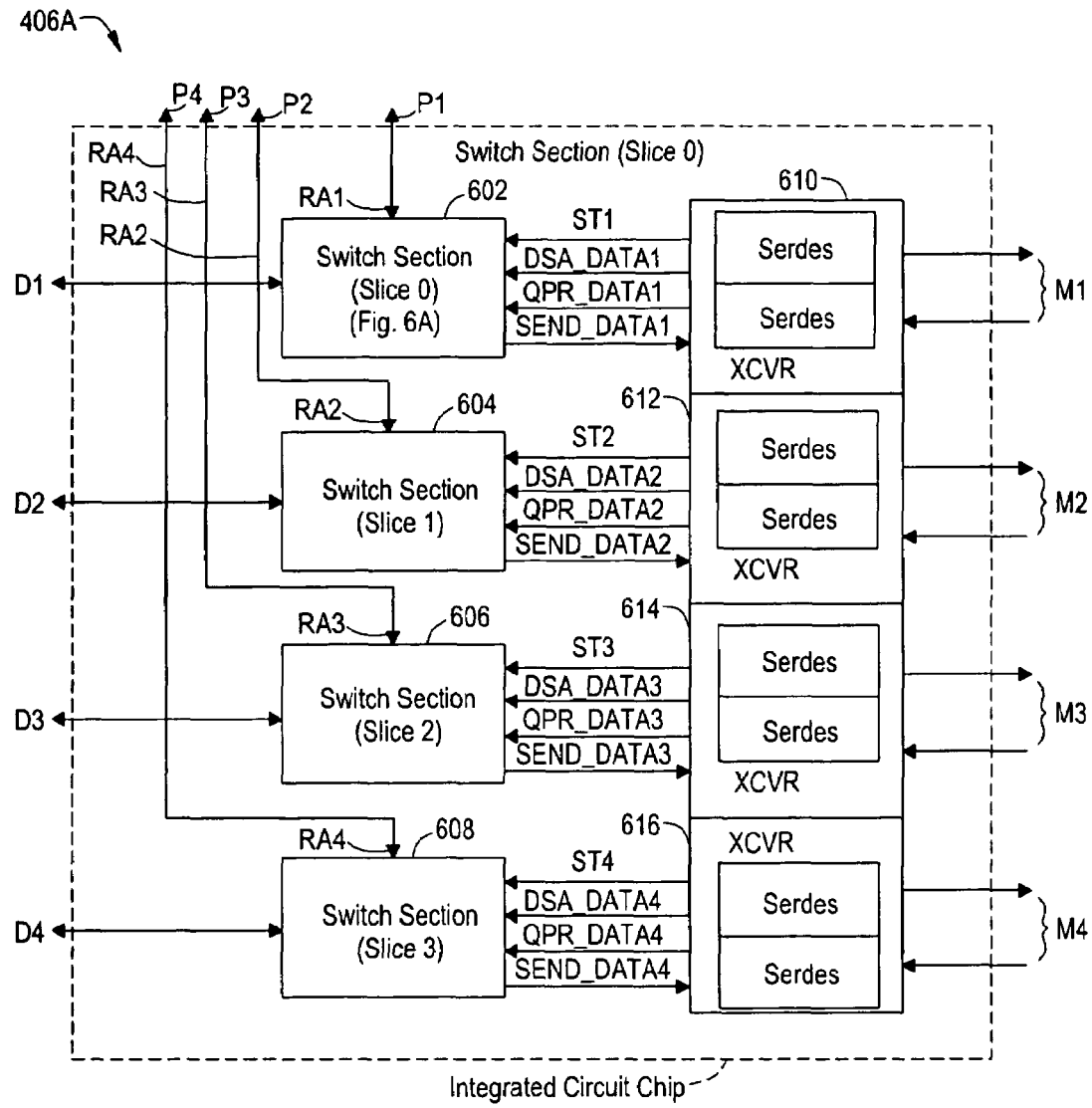
FIG. 5 is a block diagram of an exemplary one of a pair of switches used in a switching network on the director board of FIG. 3.
FIG. 6 shows the arrangement of FIGS. 6A–6D which together are a more detailed block diagram of the switch of FIG. 5.

Referring now to FIG. 5, the details of an exemplary one of the pair of switches, here switch 406A is shown. The switch 406A has, in addition to ports D1–D4 which are coupled to quad port RAMs (QPRs) 402 of a corresponding one of the four directors $180_2$–$108_4$, respectively, has four ports P1–P4 coupled to QPR controller 404 (FIG. 3) (also referred to as pipe machines, PM) of a corresponding one of the four directors $180_2$–$108_4$, respectively, as shown in FIG. 3. The switch 406A is shown in more detail in FIG. 5 to include four, identical, switch sections 602, 604, 606, and 608, respectively, as shown. The switch sections 602, 604, 606, and 608 are shown in FIGS. 6, 6A–6D. An exemplary one of the switch section 602–608, here switch 602 is shown in detail in FIG. 6A. Suffice it to say here, however, that each one of the switch sections 602, 604, 606, and 608, has pairs of ports: P1, D1, through P4, D4, respectively, as indicated. Each one of the switch sections 602, 604, 606, and 608 is coupled to a corresponding one of the transceivers (XCVRs) 610–616, respectively, as indicated. Each one of the transceivers 610–616 includes a pair of serializer/deserializers (SERDES) as shown. The SERDESs in XCVRs 610–614 are coupled to ports M1–M4, respectively, such ports M1–M4 being coupled to the cache memory 220, as shown in FIG. 4, of the memory boards, as indicated. It is noted that the switch sections 602–604 and the transceivers 610–616 are formed on a semiconductor chip.

Figure 6A:
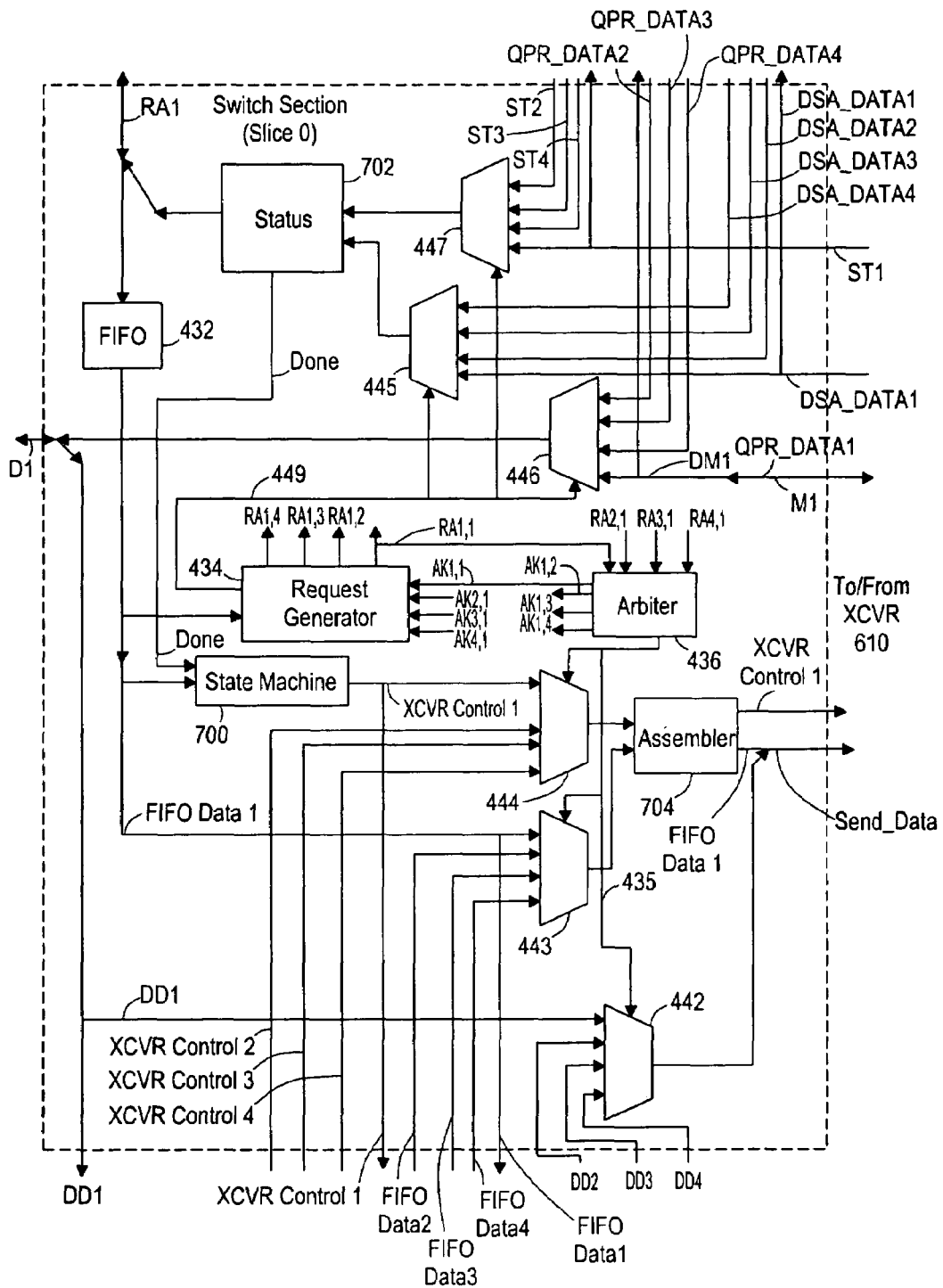
Figure 6B:
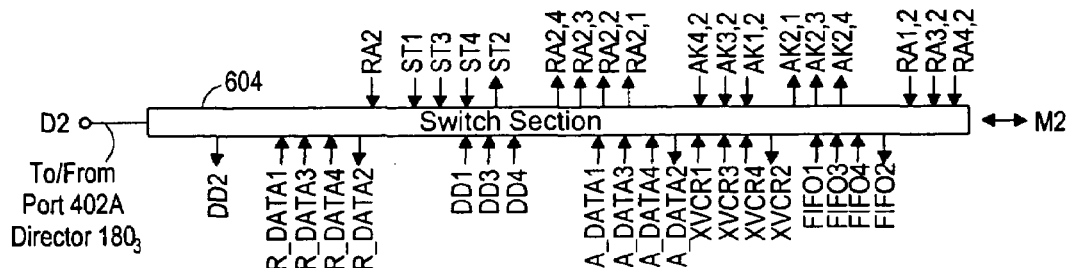
Figure 6C:
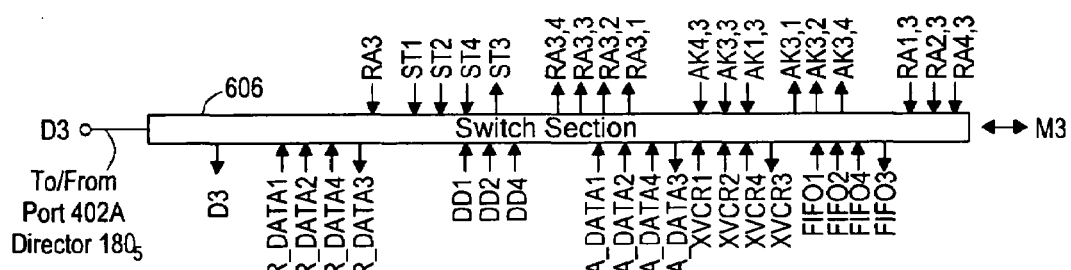
Figure 6D:
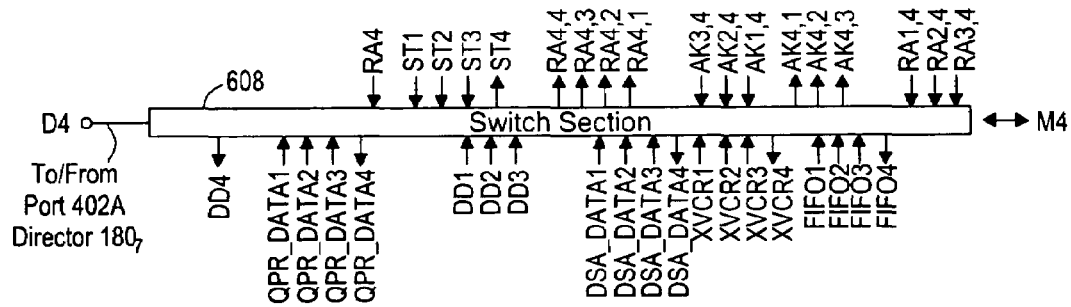

Referring now to FIGS. 6, 6A–6D, the switch sections 602–608, here switch section 602 are shown with switch section 602 being shown in more detail in FIG. 6A. Thus, switch section 602 includes a FIFO 432 fed by the signals on bus RA1 at port P1. (It should be understood that the FIFOs, not shown, in switch sections 604–608 are fed by signals on busses $R_{A2}$–$R_{A4}$, respectively, at ports $P_2$–$P_4$, respectively, as shown in FIG. 5).

The switch section 602 also includes a request generation 437, and arbiter 436, and selectors 442, 443 and 444, all arranged as shown.

It is to be noted that the data portion of the word at port $D_1$ (i.e., the word on bus DD1) is used within switch section 602 and is also coupled to the other slice sections 604, 606, 608 (FIG. 5). Likewise, the data portion of the words at ports $D_2$–$D_4$ (i.e., the words on busses DD2–DD4, respectively), and used within the switch sections 604, 606, 608 are fed to the switch section 602 on busses DD1–DD4, respectively as indicated.

It is to be noted that the data portion of the words in FIFO 432 (FIFO Data 1) is used within switch section 602 and is also coupled to the other switch sections 604, 606, 608 (FIG. 5). Likewise, the data portion of the words in the FIFOs used within the switch sections 604, 606, 608 are fed to the switch section 602 on busses FIFO Data 2–4, respectively, as indicated.

It is to be noted that the transceiver control (XCVR Control 1) produced by a state machine 700 is used within switch section 602 and is also coupled to the other switch sections 604, 606, 608 (FIG. 5). Likewise, the transceiver control (XCVR Control 2–XCVR 4) used within the switch sections 604, 606, 608 are fed to the switch section 602 on busses XCVR Control 2–XCVR Control 4, respectively, as indicated.

It is also noted that the data portions of the word at port M1 (i.e., the words produced by the transceiver 610 (FIG. 5) on buses DSA_DATA1, QPR_DATA1, ST1) are also coupled to the other switch sections 604, 606, 608. The data on the DSA_DATA1 bus data associated with a DSA transfer. The data on the QPR DATA1 is data associated with either an I/O or DMA transfer. The data on the STI bus is status data.

Finally, it is noted that the data DD1, FIFO_DATA1 passed to the memory port M1 through the transceiver 610 is also fed to the other switch sections 604, 606, 608, and in like manner the data coupled at memory ports M2–M4 are also coupled to the switch section 602.

A request on bus RA1 to switch section 602 is a request from the director 180, which identifies the one of the four ports $M_1$–$M_4$ in switch 602 is to be coupled to port 402A of director $180_1$, (QPR side port D1) for a DMA or I/O transfer. Thus, port 402A of director $180_1$ may be coupled to one of the memory side ports $M_1$–$M_4$ selectively in accordance with the data on bus $R_{A1}$. Likewise, a request on buses $R_{A2}$, $R_{A3}$, $R_{A4}$ to switch sections 604, 606, 608 (FIG. 5), respectively, are requests from the directors $180_3$, $180_5$, and $180_7$, respectively, which identifies the one of the three ports $M_2$–$M_4$ in switch sections 604, 606, 608 (FIG. 5) is to be coupled to port 402A of directors $180_3$, $180_5$ and $180_7$, respectively, (QPR side port $D_2$, $D_3$, $D_4$) for a DMA or I/O transfer.

More particularly, the requests on bus RA1 are stored as they are produced by the quad port RAM controller (i.e., PM) 404 (FIG. 3) in receive FIFO 432 (FIG. 6A). The request generator 434 (FIG. 6A) receives from FIFO 432 the requests and determines which one of the four memory-side ports $M_1$–$M_4$ is to be coupled to port 402A of director $180_1$. These requests for memory-side ports $M_1$–$M_4$ are produced on busses RA1,1–RA1,4, respectively. Thus, bus RA1,1 (i.e., the request for memory side port M1) is fed to arbiter 436 and the requests from switch sections 604, 606, 608 (FIG. 5) (which are coupled to port 402A of directors $180_3$, $180_5$, and $180_7$) on buses RA2,1, RA3,1 and RA4,1, respectively are also fed to the arbiter 436, as indicated. The arbiter 436 resolves multiple requests for memory-side port $M_1$ on a first come-first serve basis, or round robin basis, for example. The arbiter 436 then produces a control signal on bus 435 indicating the one of the directors $180_1$, $180_3$, $180_5$ or $180_7$ which is to be coupled to memory-side port $M_1$.

The control signal on bus 435 is fed to selectors 442, 443, and 444. Also fed to selector 442 are the data portion of the data at port $D_1$, i.e., the data on data bus DD1) along with the data portion of the data at ports $D_2$–$D_4$, i.e., the data on data busses DD2–DD4, respectively, as indicated. Also fed to selector 443 are the FIFO data from the FIFOs in switch sections 602, 604, 606 and 608. Also fed to selector 444 are the transceiver control signals from the state machines 700 in the switch sections 602, 604, 606 and 608. Thus, the control signal on bus 435 causes the selectors 442, 443, and 444 to couple to the output thereof the data busses DD1–DD4, FIFOs 432, and state machines 700 from the one of the directors $180_1$, $180_3$, $180_5$, $180_7$ being granted access to memory-side port $M_1$ by the arbiter 436. The selected outputs of selectors 442, 443 and 444 are combined in an assembler and sent to the memory-side port $M_1$, via the transceiver, as SEND_DATA. It should be noted that when the arbiter 436 receives a request via the signals on busses RA1,1; RA2,1; RA3,1; and RA4,1, acknowledgements are returned by the arbiter 436 via acknowledgement signals on line AK1,1, AK1,2, AK1,3, AK1,4, respectively such signals being fed to the request generators 437 in switch section 602–608, respectively.

For a memory read operation, the arbiter operates in a like manner and when a grant is issued, selectors 445, 446 and 447 are operated to enable the data read at memory port $M_1$ to pass through the switch section 602. Thus, also fed to selectors 445, 446 and 447 is a control signal produced by the request generator 434 on bus 449 in response to the request signal $R_{41}$ stored in FIFO 432. The control signal on bus 449 indicates to the selectors 445, 446 and 447 the one of the memory-side ports $M_1$–$M_4$ which is to be coupled to director-side port $D_1$ or to the bus $RA_1$. The other switch sections 604–608 operate in like manner with regard to director-side ports $D_1$–$D_4$, $R_{42}$–$R_{44}$, respectively and the memory-side ports $M_1$–$M_4$.

Figure 5A:
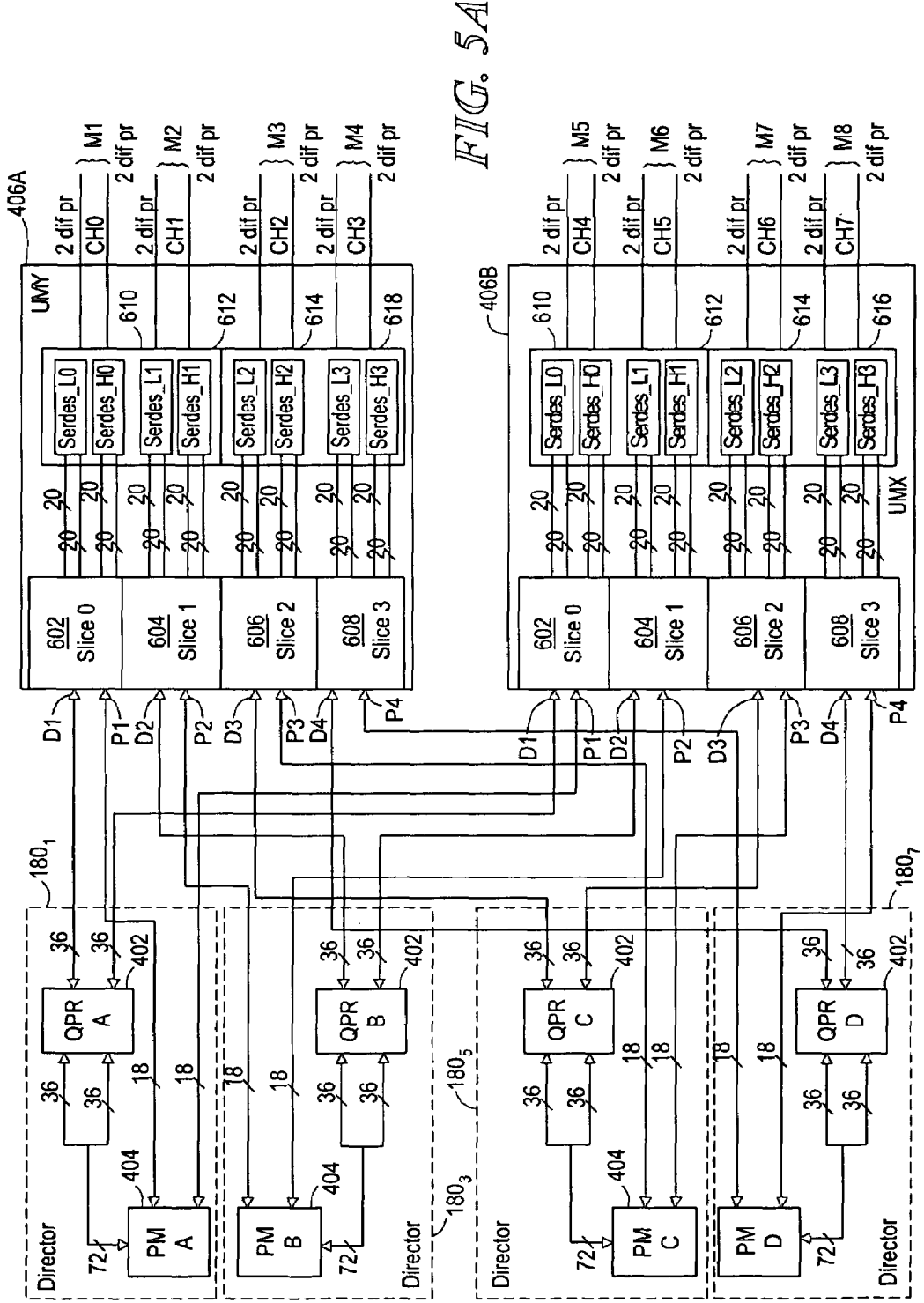
FIG. 5A is a block diagram of the pair of switches of FIG. 5 connected to other components of the plurality of directors on the director board of FIG. 3.

Referring briefly to FIGS. 2 and 3, it is noted that the switch 318 is connected to the cache memory 220 (FIG. 1) and is therefore sometimes referred to as the Upper Machine (UM). Further, as noted in FIG. 3 there are four quad port RAMs, (QPRs) 402 on each director board for director board 190 (FIG. 2), i.e., one QPR 402 for each one of the directors $180_1$, $180_2$, $180_3$, $180_4$. Referring also to FIG. 5A, the four QPRs 402 are indicated as QPR A, QPR B, QPR C, and QPR D, respectively.

It is also noted from FIG. 3 that there are four quad port RAM controllers 404, or pipe machines (PM), on each director board $190_1$ (FIG. 2) as shown in FIG. 3 for director board $190_1$, i.e., one PM for each one of the directors $180_1$, $180_2$, $180_3$, $180_4$. Referring also to FIG. 5A, the four PMs 402 are indicated as PM A, PM B, PM C, and PM D, respectively.

Referring to FIG. 5, the switch sections 602, 604, 606, 608 interact with each other as described above so that each PM and QPR can access all serial channels to the memory 220 (FIG. 1). That is, each one of the four slices (i.e., switch sections 602, 604, 606, 608) communicates with one PM and one QPR on its "lower" side and with one serial channel connected to a memory board of cache memory 220 (FIG. 4) on its "upper" side.

The State Machine 700 is the main control unit of the slice. Upon receiving an acknowledge from the Arbiter 436 and source of data from the Request generator 437, it issues control signals to the QPR (a DMA or I/O transfer) or FIFO 432 (a DSA or internal register transfer), moves the appropriate data through the slice, notifies the XCVR about the incoming data to allow the transfer to occur with a transfer counter, and issues "done" to the other blocks.

The XCVRs 600, 612, 614, 618 (FIG. 5) control the transfer of the command and data for a corresponding one of the channels (FIG. 5A) to the one of the memory ports $M_1$–$M_4$, respectively, coupled thereto across the backplane and returns the status of each transfer to the Status section 702 (FIG. 6A). The XCVR generates CRC for each set of commands sent to the memory board and for each burst of data on a write. The memory board generates CRC from the data for read data bursts. The XCVR checks the CRC at the end of each read data and transfer status burst.

The Status section 702 (FIG. 6A), referred to as an internal register or internal registers) is associated with one PM. It is responsible for returning DSA/Status data to the PM. On a DSA read, the Status section 702 can receive data from the appropriate XCVR. The Status register 702 also receives and returns transfer status at the end of a transfer.

The Assembler 704 (FIG. 6A) takes the 18 bits of command and DSA write and assembles it into 36 bits of data.

More particularly, since the data passing between the PM and the FIFO 432 has 18 bits (16 bits+2 parity bits) and since the global memory 220 is adapted to receive 36 bits from the QPR (32 bits+4 parity bits) the assembler 704 combines two successive 18 bit data from the PM (i.e., read from the FIFO 432) into one 36 bit word.

Figure 7:
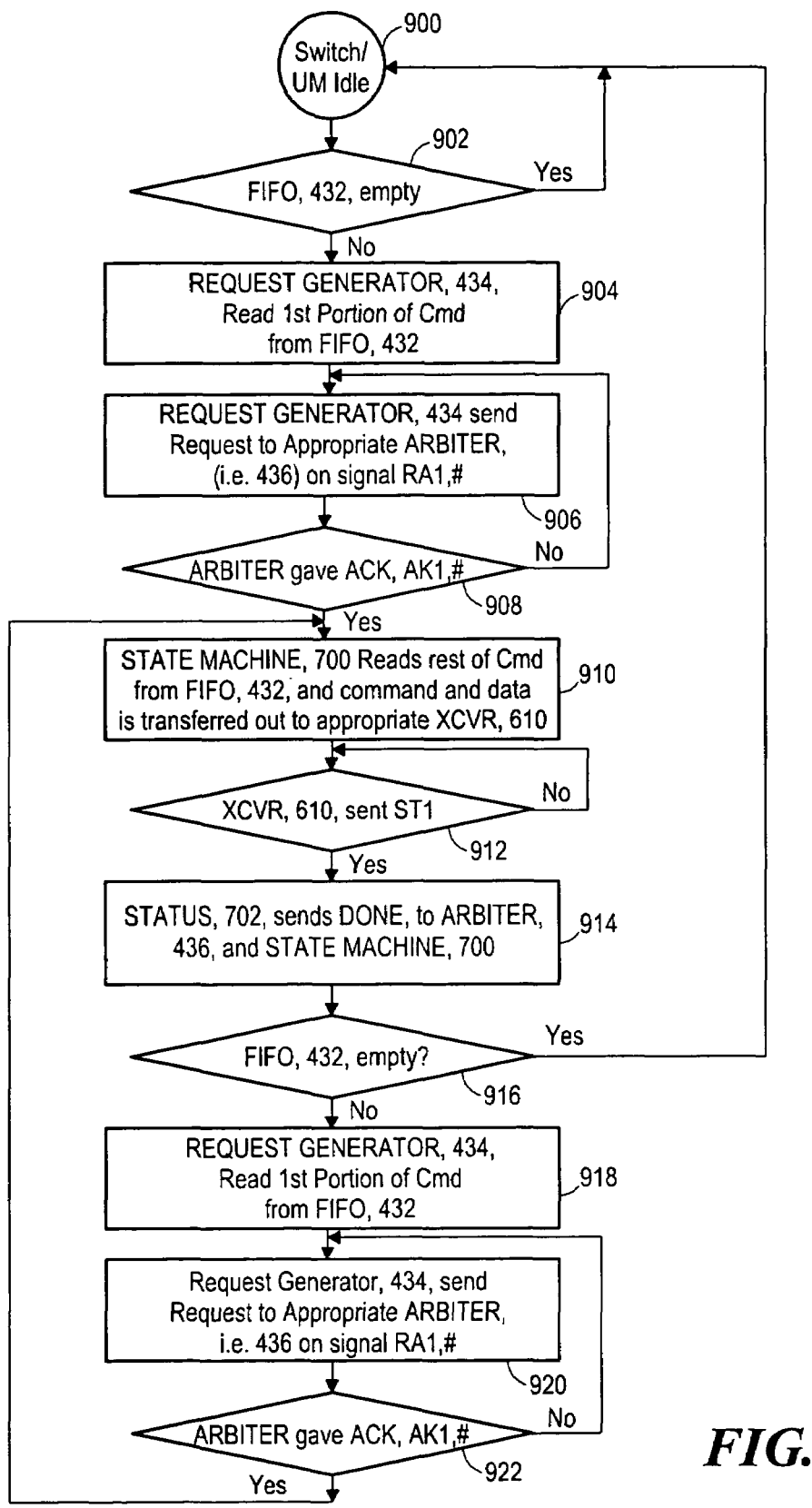
FIG. 7 is a flow diagram of a process used in the switches of FIGS. 6A–6D.

Referring now to FIG. 7 a flow diagram is shown of a process used in executing commands stored in the FIFO 432 (FIG. 6A).

Initially, the process is in an idle condition, Step 900.

In Step 902, the state machine 700 checks whether the FIFO 432 is empty. If the FIFO 432 is empty, the state machine 700 returns to an idle condition; otherwise, a first portion of a command is read from the FIFO 432, Step 904.

In Step 906, the request generator 434 sends a request to the appropriate arbiter 436 (depending on the content of the first word of the command) and to the state machine 700. When the arbiter 436 provides an acknowledgement, Step 908, the state machine 700 reads the remaining portion of the command from the FIFO 432 and the command together with the data associated with the command is transferred from the FIFO 432 and the QPR to the appropriate transceiver, Step 910.

In Step 912, when a status signal STI for example is send to the status section 702, the status section 702 sends a DONE signal to the state machine 700, Step 914.

Next, a determination is made as to whether the FIFO is empty, Step 916. If the FIFO is empty, the process returns to the idle condition, Step 900; otherwise, the process proceeds to Step 918 where the request generator 434 reads the first portion of a command from the next succeeding one of the plurality of commands stored in the FIFO 432.

In Step 922, when the arbiter 436 provides an acknowledgement, the process returns to Step 910.

With such process, the status register provides a DONE signal indicating when a command is successfully transferred to the memory thereby enabling a succeeding one of the commands in the buffer to be transferred to the memory in response to the done signal.

Other embodiments are within the spirit and scope of the appended claims.

What is claimed is:

1. A system interface comprising:
   (a) a cache memory;
   (b) a plurality of directors, each one of the plurality of directors comprising:
      (i) a data pipe coupled between an input of such one of the directors, such data pipe comprising:
         (A) a data pipe memory;
         (B) a data pipe memory controller for controlling the data pipe memory; and
      (ii) a microprocessor coupled to the data pipe memory controller;
   (c) a switching network coupled to the cache memory to transfer data between the memory and: (a) the input of a selected one of the plurality of directors each one of the plurality of directors through the data pipe memory; (b) the microprocessor and the data pipe memory through the data pipe memory controller of a selected one of the plurality of directors; and (c) the microprocessor and the data pipe memory controller while by-passing the data pipe memory of a selected one of the plurality of directors.

2. A system interface comprising:
   (a) a cache memory;
   (b) a plurality of directors, each one of the plurality of directors comprising:
      (i) a data pipe coupled between an input of such one of the directors, such data pipe comprising:
         (A) a data pipe memory having a pair of ports;
         (B) a data pipe memory controller for controlling the data pipe memory, such data pipe memory controller having a pair of ports; and (ii) a microprocessor coupled to the data pipe memory controller;

(c) a switching network having:
(1) a plurality of first ports, each one being coupled to a corresponding one of a first one of the pair of ports of the data pipe memory of the plurality of directors;
(2) a plurality of second ports, each one being coupled to a corresponding one of a second one of the pair of ports of the data pipe memory of the plurality of directors;
(3) a plurality of third ports each one being coupled to a corresponding one of a first one of the pair of ports of the data pipe memory controller of the plurality of directors;
(4) a plurality of fourth ports, each one being coupled to a corresponding one of a second one of the pair of ports of the data pipe memory controller of the plurality of directors; and
(5) wherein such switching network is coupled to the cache memory to transfer data between the memory and: (a) the input of a selected one of the plurality of directors each one of the plurality of directors through the data pipe memory; (b) the microprocessor and the data pipe memory through the data pipe memory controller of a selected one of the plurality of directors; and (c) the microprocessor and the data pipe memory controller while by-passing the data pipe memory of a selected one of the plurality of directors.

3. The system recited in claim 2 wherein such switching network is coupled to the cache memory to transfer data between the memory and: (a) the input of a selected one of the plurality of directors each one of the plurality of directors through the data pipe memory through the first or second ports of the switch network; (b) the microprocessor and the data pipe memory through the data pipe memory controller through the first or second ports of the switch network of a selected one of the plurality of directors; and (c) the microprocessor and the data pipe memory controller while by-passing the data pipe memory through the third or fourth ports of the switch network of a selected one of the plurality of directors.

4. The system recited in claim 3 wherein the switch network includes a pair of switches, one of such switches being coupled to a first portion of the cache memory and another one of the switches being coupled to a second portion of the cache memory, wherein the first one of the pair of switches has the first ports and the third ports and wherein the second one of the switches has the second ports and the fourth ports.

5. The system recited in claim 2 wherein the data pipe memory is a quad port RAM.

6. The system recited in claim 3 wherein the data pipe memory is a quad port RAM.

7. The system recited in claim 4 wherein the data pipe memory is a quad port RAM.

8. The system recited in claim 4 wherein each one of the pair of switches includes:
a plurality of switch sections, each one being coupled a corresponding one of the first ports and a corresponding one of the third ports;
each one of the switch sections comprising:
a buffer coupled to said corresponding one of the third ports for receiving successive commands on the corresponding one of the third ports;
a status section for providing a done signal indicating when a command is successfully transferred to the memory;
a controller coupled to the buffer and the status section for enabling a succeeding one of the commands in the buffer to be transferred to the memory in response to the done signal.

9. The system recited in claim 4 wherein the data pipe memory is a quad port RAM.

10. The system recited in claim 8 wherein the buffer is a FIFO.

11. The system recited in claim 10 wherein the data pipe memory is a quad port RAM.

12. A method for operating a system interface having: (a) a cache memory; (b) a plurality of directors, each one of the plurality of directors comprising: (i) a data pipe coupled between an input of such one of the directors, such data pipe comprising: (A) a data pipe memory having a pair of ports; (B) a data pipe memory controller for controlling the data pipe memory, such data pipe memory controller having a pair of ports; and (ii) a microprocessor coupled to the data pipe memory controller; and (c) a switching network having: (1) a plurality of first ports, each one being coupled to a corresponding one of a first one of the pair of ports of the data pipe memory of the plurality of directors; (2) a plurality of second ports, each one being coupled to a corresponding one of a second one of the pair of ports of the data pipe memory of the plurality of directors; (3) a plurality of third ports each one being coupled to a corresponding one of a first one of the pair of ports of the data pipe memory controller of the plurality of directors; (4) a plurality of fourth ports, each one being coupled to a corresponding one of a second one of the pair of ports of the data pipe memory controller of the plurality of directors; and (5) wherein such switching network is coupled to the cache memory to transfer data between the memory and: (a) the input of a selected one of the plurality of directors through the data pipe memory through the first or second ports of the switch network; (b) the microprocessor and the data pipe memory through the data pipe memory controller through the first or second ports of the switch network of a selected one of the plurality of directors; and (c) the microprocessor and the data pipe memory controller while by-passing the data pipe memory through the third or fourth ports of the switch network of a selected one of the plurality of directors; wherein the switch network includes a pair of switches, one of such switches being coupled to a first portion of the cache memory and another one of the switches being coupled to a second portion of the cache memory, wherein the first one of the pair of switches has the first ports and the third ports and wherein the second one of the switches has the second ports and the fourth ports, wherein each one of the pair of switches includes: a plurality of switch sections, each one being coupled a corresponding one of the first ports and a corresponding one of the third ports; each one of the switch sections comprising: a buffer coupled to said corresponding one of the third ports for receiving successive commands on the corresponding one of the third ports; a status section for providing a done signal indicating when a command is successfully transferred to the memory; and a controller coupled to the buffer and the status section, such method comprising:
enabling a succeeding one of the commands in the buffer to be transferred to the memory in response to the done signal.

* * * * *